United States Patent [19]

Krech, Jr. et al.

[11] Patent Number: 5,949,440

[45] Date of Patent: *Sep. 7, 1999

[54] METHOD AND APPARATUS FOR PROCESSING GRAPHICS PRIMITIVES IN MULTIPLE MODES USING RECONFIGURABLE HARDWARE

[75] Inventors: Alan S. Krech, Jr.; Noel D. Scott, both of Fort Collins, Colo.

[73] Assignee: Hewlett Packard Compnay, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/977,710

[22] Filed: Nov. 25, 1997

Related U.S. Application Data

[63] Continuation of application No. 08/640,433, Apr. 30, 1996, abandoned.

[51] Int. Cl.[6] ........................................... G06T 1/20
[52] U.S. Cl. ........................................... 345/506; 345/511
[58] Field of Search ..................................... 345/506, 502, 345/505, 508, 511, 507, 509, 513, 515, 516, 521, 433

[56] References Cited

U.S. PATENT DOCUMENTS

| | | |
|---|---|---|
| 4,720,780 | 1/1988 | Dolecek ............................. 395/800.18 |
| 4,949,301 | 8/1990 | Joshi et al. ............................. 364/900 |
| 5,027,315 | 6/1991 | Agrawal et al. ............................ 326/38 |
| 5,208,909 | 5/1993 | Corona et al. ........................... 395/155 |
| 5,224,210 | 6/1993 | Pinedo et al. ........................... 395/164 |
| 5,255,359 | 10/1993 | Ebbers et al. ............................ 395/161 |
| 5,289,577 | 2/1994 | Gonzales et al. ....................... 395/163 |
| 5,373,368 | 12/1994 | Taniguro ................................. 358/296 |
| 5,394,524 | 2/1995 | DiNicola et al. ....................... 395/163 |
| 5,420,980 | 5/1995 | Pinedo et al. ........................... 395/164 |
| 5,564,009 | 10/1996 | Pinedo et al. ........................... 395/164 |

*Primary Examiner*—Kee M. Tung

[57] ABSTRACT

A graphics processor is disclosed having two processing units and two dual-port RAMs for passing data between the processing units. The hardware is configured to process two graphics primitives simultaneously in a first mode, and to use both processing units simultaneously to process a single primitive in a second mode. One of the dual-port RAMs may function as a FIFO buffer in the second mode. A method for processing graphics primitives is disclosed in which one processing unit generates a set of intermediate results for a first primitive and stores them in a first RAM, and then generates a set of intermediate results for a second primitive and stores them in a second RAM while another processing unit reads the first RAM and completes calculations for the first primitive. Afterwards, the second processing unit reads the second RAM and completes calculations for the second primitive. Another method for processing graphics primitives is disclosed in which the first processing unit generates two sets of intermediate results for the same primitive, and in which the second processing unit generates final results for the primitive in two parts.

3 Claims, 3 Drawing Sheets

METHOD AND APPARATUS FOR PROCESSING GRAPHICS PRIMITIVES IN MULTIPLE MODES USING RECONFIGURABLE HARDWARE

CROSS REFERENCE TO RELATED APPLICATION

This is a continuation of application Ser. No. 08/640433 filed on Apr. 30, 1996, now abandoned.

FIELD OF THE INVENTION

This invention relates to computer graphics processing methods and apparatus, and more particularly to methods and apparatus for using multiple processors and multiple reconfigurable buffers to process graphics primitives in multiple modes. Even more particularly, the invention relates to a method and apparatus for using two processors and two reconfigurable RAM buffers to process two graphics primitives simultaneously in a first mode, and to process different aspects of a single graphics primitive simultaneously in a second mode.

BACKGROUND

In a typical computer graphics system, an object to be represented on a display screen is broken down into graphics primitives. Graphics primitives are basic geometric elements such as points, lines, vectors, triangles and quadrilaterals. Computer graphics systems use graphics primitives in combination to represent more complex shapes. A typical system for generating and displaying graphics primitives might include a host processor, application and system/driver software running on the host processor, and a specialized subsystem of graphics processing hardware that is controlled by the software running on the host processor.

Many mathematical operations are necessary to process and display graphics primitives. In lower-end computer systems, most of those operations are performed by the host processor. In such lower-end systems, only a simple set of operations need be performed by the graphics subsystem in order to display the graphics information produced by the host processor. In higher-end computer systems, however, better performance is achieved by providing a graphics subsystem that has the capacity to perform many of the mathematical operations that, in lower-end systems, must be performed by the host processor. In such higher-end systems, the host processor may generate graphics information at a fairly abstract level. The host processor then relies on "graphics accelerator" hardware in the graphics subsystem to reduce the abstract information to simpler forms more suitable for downstream operations such as rasterization and storage in a frame buffer memory. In this manner, tasks are off loaded from the host processor, thereby saving host processor bandwidth for higher-level operations.

Various techniques have been employed to improve the performance of graphics accelerators. One such technique has been to include more than one graphics processor in the graphics accelerator architecture. Because graphics primitives vary, however, as to the number and type of computations necessary to process them, it is a challenge in multi-processor architectures to utilize processing power as effectively as possible for different kinds of primitives. For example, primitives may be generated by the host processor for display in a non-positional lighting mode, so that the graphics accelerator need only do cursory lighting operations along with the usual clipping, plane equation and transformation operations necessary for each primitive. In such a case, an effective allocation of accelerator processing power might be to have complete parallelism or some degree of pipelining, in which two graphics processors may work on two different primitives simultaneously. On the other hand, primitives may be generated by the host processor for display in a positional lighting mode, so that the graphics accelerator must perform numerous additional and more complex lighting calculations along with the usual clipping, plane equation and transformation operations necessary for each primitive. In the latter case, the same parallelism or pipelining scheme used for non-positionally lighted primitives may no longer utilize both graphics processors effectively, particularly if all of the graphics processors in the accelerator do not have the same capabilities. Thus, using such a scheme for positionally-lighted primitives would result in degraded accelerator performance.

It is therefore an object of the present invention to provide a graphics accelerator method and architecture that utilizes the bandwidth of multiple graphics processors very effectively not only for a single kind of graphics primitive and lighting mode, but also for a variety of different kinds of graphics primitives and lighting modes.

SUMMARY OF THE INVENTION

In one embodiment, the invention is a method of processing two graphics primitives simultaneously using two processors in a pipelined architecture. A first processor calculates a set of intermediate results for the first primitive and passes those results to a second processor. The second processor uses those intermediate results to calculate a final set of results for the first primitive. Preferably while the second processor is working on the first primitive, the first processor begins work on a second primitive. The first processor calculates a set of intermediate results for the second primitive and passes them to the second processor. When the second processor finishes work on the first primitive, it begins work on the second primitive. The second processor uses the intermediate results calculated for the second primitive by the first processor to calculate final results for the second primitive. Preferably, the intermediate results for the first primitive from the first processor are written into a first RAM, and the second processor reads those results from the first RAM. The intermediate results for the second primitive from the first processor are written into a second RAM, and the second processor reads those results from the second RAM when it is ready to begin processing the second primitive.

In a second embodiment, the invention is a method of processing a single primitive using two processors simultaneously. The first processor generates a first set of intermediate results and passes those to the second processor. The second processor uses the first set of intermediate results to produce the first part of the final results for the primitive. Preferably while the second processor is producing the first part of the final results for the primitive, the first processor begins producing a second set of intermediate results for the primitive and passes those to the second processor. When the second processor finishes calculating the first part of the final results, it uses the second set of intermediate results to produce the remaining part of the final results for the primitive. In one preferred embodiment, the first processor passes its first and second intermediate results to the second processor by writing them to first and second RAMs, respectively. In a second preferred embodiment, the first processor passes its first intermediate results to the second processor by writing them to a RAM, but passes its second set of intermediate results to the second processor through a FIFO buffer.

In a third embodiment, both of the above two methods are combined by processing first and second graphics primitives with the first method using first and second RAMs, activating a FIFO control mechanism to cause one of the RAMs to function as a FIFO buffer, and then processing the third primitive with the third method using one RAM and the newly-activated FIFO buffer.

In a fourth embodiment, the invention is a graphics processor configured to implement the above methods. In a first mode, the processor processes two different graphics primitives simultaneously. In a second mode, the processor uses two processing units simultaneously to process a single graphics primitive. The graphics processor includes a data input and a data path for communicating primitive data to a first processing unit. The graphics processor also includes a second processing unit whose output is coupled by a data path to a data output. In between the first and second processing units are first and second dual-port RAMs. Circuitry is provided for generating read and write address for the RAMs, as well as read and write enable signals. Finally, circuitry is provided for gating the read and write enable signals alternately to the first and second RAMs, and a controller is provided to operate the gating circuitry in order for the graphics processor to implement the above-described methods. Preferably, circuitry is also provided to cause one of the dual-port RAMs to behave as a FIFO buffer when necessary.

BRIEF DESCRIPTION OF THE DRAWINGS

The present invention is described herein with reference to the accompanying drawings, like reference numbers being used therein to indicate identical or functionally similar elements.

DETAILED DESCRIPTION OF THE PREFERRED EMBODIMENTS

Figure 1:
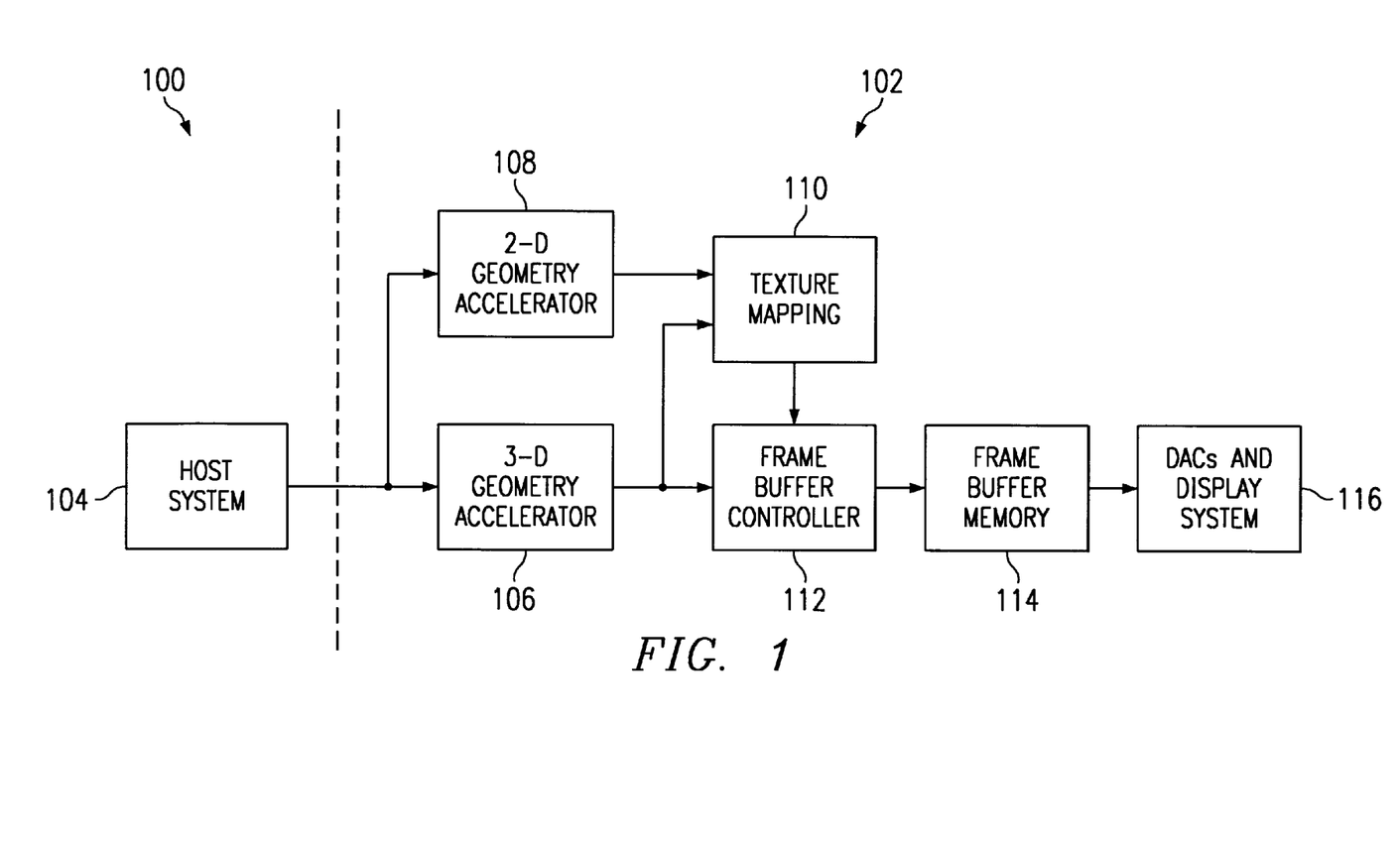
FIG. 1 is a block diagram of a computer system in which the invention may find useful application.

FIG. 1 is a block diagram of a computer system 100 suitable for incorporating the present invention. Computer system 100 includes a high-performance graphics subsystem 102. Host system 104 may be any general-purpose computer system with a host processor, memory, input/output systems and application/system/driver software for controlling graphics subsystem 102. Host system 104 is coupled to 3-D geometry accelerator 106 and 2-D geometry accelerator 108. In other embodiments, host processor 104 may be coupled to fewer than two or more than two such accelerators. For example, a lower performance graphics subsystem might not include a 2-D geometry accelerator 108 or a texture mapping system 110, while a higher performance graphics subsystem might include several 3-D geometry accelerators configured in parallel.

Host system 104 produces primitives to be rendered and passes them to geometry accelerators 106 and 108 in the form of data sets. Such data sets typically include a series of address/data pairs specifying relevant attributes of the primitive to be rendered. For example, one address/data pair may specify the X coordinate of one vertex of a triangle primitive. The next two pairs may specify the Y and Z coordinates for the same vertex of the same triangle primitive. Other pairs may specify information such as the "alpha" or transparency value for the vertex, the R, G and B color intensity values for the vertex, the X, Y and Z components of the normal value for the vertex, and the S and T coordinates for texture mapping of the vertex. Once all of the information for all of the vertices of the triangle primitive has been loaded into a given geometry accelerator, host system 104 typically issues a command to the accelerator requesting it to begin processing the just-loaded primitive.

Processing of primitives by geometry accelerators 106 and 108 may involve operations such as transformations (scaling, rotation and translation operations), calculation of slopes for the various attributes of the primitive along the primitive's edges, lighting calculations, clipping calculations and plane equation calculations. Once such calculations have been completed, geometry accelerators 106 and 108 may load their sets of results into downstream hardware such as texture mapping system 110 and frame buffer controller 112, and then issue a command ordering the downstream hardware to continue processing the new information. Typically, texture mapping system 110 outputs texture data to be combined by frame buffer controller 112 with primitive data exiting 3-D geometry accelerator 106. In addition to combining such information, frame buffer controller 112 also performs a rasterization function by calculating appropriate values for each pixel that will represent the primitive. These values are calculated based on the transformed vertex, slope and other information produced by 3-D geometry accelerator 106. Frame buffer controller 112 writes the resulting pixel values into frame buffer memory 114. The values in frame buffer memory 114 are read continuously by display system 116. Display system 116 typically converts the read pixel values into analog form using digital to analog converters ("DACs") and displays them on a monitor device such as a CRT.

While the present invention may find application in a variety of graphics processing devices, it is believed that the invention will best be implemented in a graphics accelerator such as 3-D geometry accelerator 106.

Figure 2:
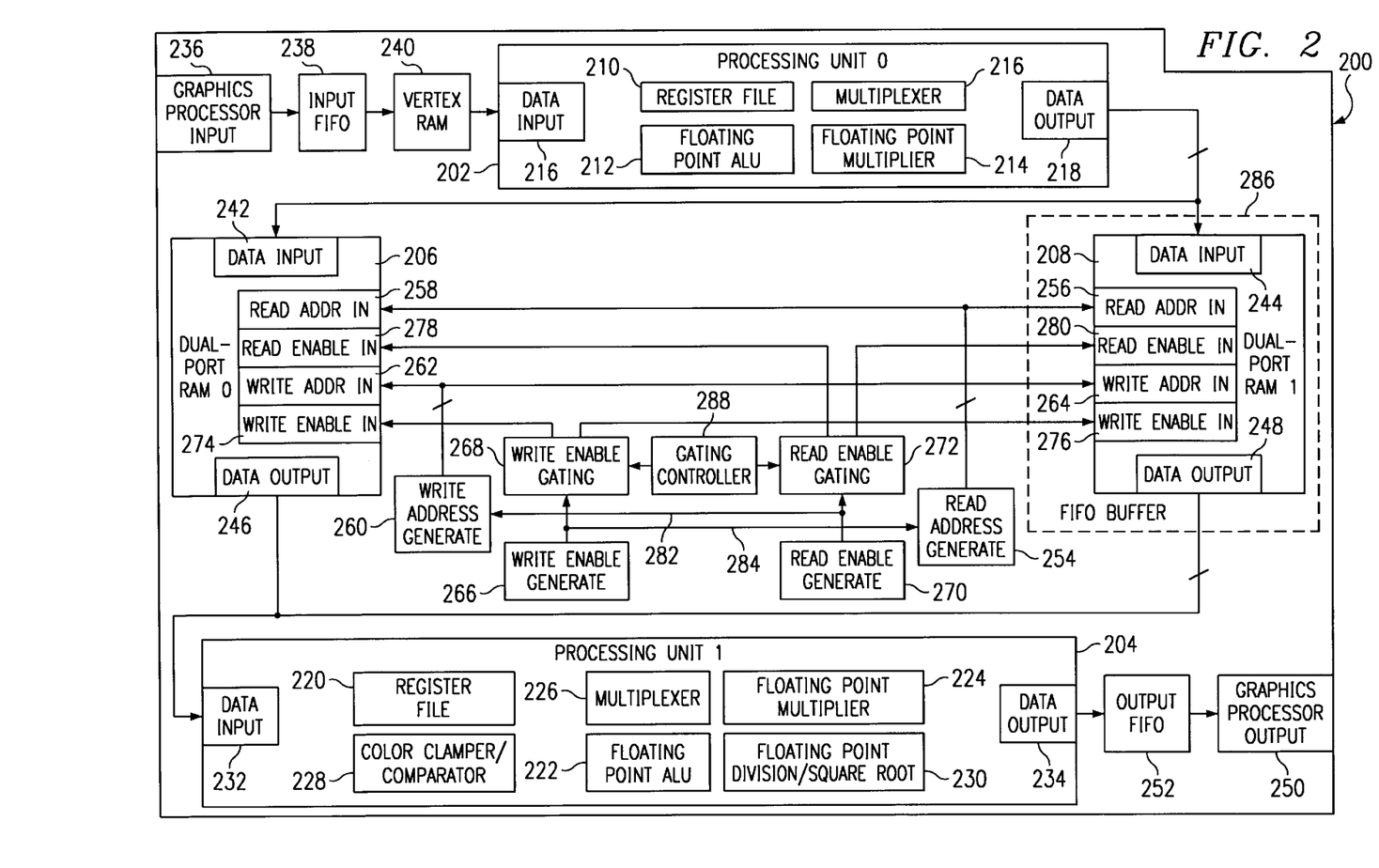
FIG. 2 is a block diagram of a graphics processor configured according to a preferred embodiment of the invention.

FIG. 2 is a block diagram illustrating how a graphics processor such as 3-D geometry accelerator 106 may be configured according to a preferred embodiment of the invention. Graphics processor 200 includes a first processing unit 202, a second processing unit 204, a first dual-port RAM 206 and a second dual-port RAM 208. Although processing unit 202 and processing unit 204 may be implemented so that they both have the same components and thus the same capabilities, in a reduced-cost preferred embodiment, one of the processing units is configured to have fewer components and capabilities than the other. This type of unequal and cost-saving arrangement is made feasible by the invention because the hardware of graphics processor 200 may be reconfigured, when necessary, to make the capabilities of each processing unit more accessible. In the embodiment shown, processing unit 202 contains a register file 210, a floating point arithmetic and logic unit ("ALU") 212, a floating point multiplier 214, and multiplexer circuitry 216 for providing appropriate switching and data paths within processing unit 202. Processing unit 202 is also equipped with a data input 216 and a data output 218. Processing unit 204, on the other hand, contains more components. In addition to a register file 220, a floating point ALU 222, a floating point multiplier 224 and a multiplexer circuitry 226, processing unit 204 also contains a color clamper/comparator 228 and a floating point division/square root unit 230. Processing unit 204 is also equipped with a data input 232 and a data output 234. Graphics processor input 236 is coupled to input FIFO 238. The output of input FIFO 238 is coupled to data input 216 via vertex RAM 240. Thus, in this embodiment, graphics processor input 236, input FIFO 238 and vertex RAM 240 form an input data path. Vertex RAM 240 acts as a repository for an input data set (corresponding to a primitive) before a command is received by graphics processor 200 to draw the primitive. In a preferred embodiment, vertex RAM 240 may be double buffered so that it may begin accumulating information corresponding to a new primitive after the command is received to draw the primitive already stored in vertex RAM 240.

Data output 218 is coupled to dual-port RAMs 206 and 208 at data inputs 242 and 244, respectively. Data outputs 246 and 248 of dual-port RAMs 206 and 208, respectively, are coupled to data input 232 of processing unit 204. Data output 234 of processing unit 204 is coupled to graphics processor output 250 via output FIFO 252, forming an output data path.

A read address generator 254 is provided, with its output coupled to read address input 256 of dual-port RAM 208, as well as to read address input 258 of dual-port RAM 206. Similarly, a write address generator 260 is provided, with its output coupled to write address input 262 of dual-port RAM 206, as well as to write address input 264 of dual-port RAM 208. A write enable generator 266 is provided, with its output coupled to a write enable gating device 268. A read enable generator 270 is provided, with its output coupled to a read enable gating device 272. Write enable gating device 268 has two outputs, one driving write enable input 274 of dual-port RAM 206, and the other driving write enable input 276 of dual-port RAM 208. Read enable gating device 272 has two outputs, one driving read enable input 278 of dual-port RAM 206, and the other driving read enable input 280 of dual-port RAM 208. Read enable gating device 272 and write enable gating device 268 are controlled by gating controller 288. In this manner, the write enable signal may be routed either to dual-port RAM 206 or to dual-port RAM 208. Likewise, the read enable signal may be routed either to dual-port RAM 206 or to dual-port RAM 208.

As is indicated by a dashed line in the drawing, dual-port RAM 208 may function as either a RAM or a FIFO buffer 286, depending on the operation of the read and write address generators, the gating devices and the gating controller. A wire 282 is provided between the read enable signal and write address generator 260, and a wire 284 is provided between the write enable signal and read address generator 254. These wires provide a means for the respective address generators to sense when reads and writes are occurring with respect to dual-port RAM 208 in order to keep track of FIFO contents when dual-port RAM 208 is being used as FIFO buffer 286.

The operation of graphics processor 200 may best be appreciated with reference to Tables 1, 2 and 3 below.

TABLE 1

Non - Positional Lights Mode

| | Processing Unit 0 | | | | | | | Processing Unit 1 | | | |
| --- | --- | --- | --- | --- | --- | --- | --- | --- | --- | --- | --- |
| | | | | | RAM 0 | | RAM 1 | | | | |
| Row | Source of inputs | Description of inputs | Description of operations | Destination of outputs | Contents | Status | Contents | Status | Source of inputs | Description of inputs | Description of operations | Destination of outputs |
| 1 | input data path | data set for prim. 1 | generate intermediate results for prim. 1 | RAM 0 | — | filling with data from P.U. 0 | — | — | — | — | — | — |
| 2 | input data path | data set for prim. 2 | generate intermediate results for prim. 2 | RAM 1 | intermediate results for prim. 1 | being read by P.U. 1 | — | filling with data from P.U. 0 | RAM 0 | intermediate results for prim. 1 | generate final results for prim. 1 | output data path |
| 3 | input data path | data set for prim. 3 | generate intermediate results for prim. 3 | RAM 0 | — | filling with data from P.U. 0 | intermediate results for prim. 2 | being read by P.U. 1 | RAM 1 | intermediate results for prim. 2 | generate final results for prim. 2 | output data path |
| 4 | input data path | data set for prim. 4 | generate intermediate results for prim. 4 | RAM 1 | intermediate results for prim. 3 | being read by P.U. 1 | — | filling with data from P.U. 0 | RAM 0 | intermediate results for prim. 3 | generate final results for prim. 3 | output data path |
| 5 | — | — | — | — | — | — | intermediate results for prim. 4 | being read by P.U. 1 | RAM 1 | intermediate results for prim. 4 | generate final results for prim. 4 | output data path |

Table 1 illustrates a preferred flow of operations for graphics processor 200 when it is processing primitives for which lighting is not positional in nature, while Tables 2 and 3 illustrate two different preferred flows of operation for processing primitives for which lighting is positional. Non-positional lighting means that the same lighting information is generally applicable to all primitives in a modeling scene. Positional lighting, on the other hand, means that the modeling scene itself contains light sources. When positional lighting is present, the distance must be calculated between each vertex of a primitive and each light source in the modeling scene. This is preferably done by calculating the square roots of the sum-of-squares values between the vertices and the lights sources. For non-positionally lighted primitives, these calculations are not necessary.

Referring now to Table 1, we will walk through an example in which four graphics primitives, called primitives 1, 2, 3 and 4, are processed in non-positional lighting mode. In row 1, processing unit 0 begins processing primitive 1 by generating a set of intermediate results for primitive 1. These results are written into RAM 0 by means of write address generator 260, write enable generator 266, write enable gating device 268 and gating controller 288. When processing unit 0 has finished generating the intermediate results for primitive 1, we move to row 2. In row 2, both of the processing units are active:

Processing unit 1 is reading the intermediate results for primitive 1 out of RAM 0 by means of read address generator 254, read enable generator 270, read enable gating device 272 and gating controller 288. It uses these intermediate results to calculate final results for primitive 1, which it sends to the output data path. Simultaneously, processing unit 0 begins generating a set of intermediate results for primitive 2. It stores these intermediate results in RAM 1 by means of write address generator 260, write enable generator 266, write enable gating device 268 and gating controller 288. After these operations are complete, we proceed to row 3:

In row 3, processing unit 1 begins generating the final results for primitive 2 by reading primitive 2's intermediate results from RAM 1. Simultaneously, processing unit 0 begins generating intermediate results for primitive 3, which it stores in RAM 0.

In row 4, processing unit 1 generates final results for primitive 3 by reading primitive 3's intermediate results from RAM 0. Meanwhile, processing unit 0 generates intermediate results for primitive 4 and stores them in RAM 1. Finally, in row 5, processing unit 1 generates final results for primitive 4 by reading primitive 4's intermediate results from RAM 1.

In a preferred embodiment, the intermediate results for each primitive calculated by processing unit 0 in non-positional lighting mode would be results from transformations and partial slope calculations. The final results calculated by processing unit 1 for each primitive would be results from clipping, plane equations and lighting calculations. This division of labor between processing units in this embodiment and those that follow may be varied in other embodiments.

TABLE 2

Positional Lights Mode

| | Processing Unit 0 | | | | | | | Processing Unit 1 | | | |
|---|---|---|---|---|---|---|---|---|---|---|---|
| | | | | | RAM 0 | | RAM 1 | | | | |
| Row | Source of inputs | Description of inputs | Description of operations | Destination of outputs | Contents | Status | Contents | Status | Source of inputs | Description of inputs | Description of operations | Destination of outputs |
| 1 | input data path | data set for prim. 1 | generate first intermediate results for prim. 1 | RAM 0 | — | filling with data from P.U. 0 | — | — | — | — | — | — |
| 2 | input data path | data set for prim. 1 | generate second intermediate results for prim. 1 | RAM 1 | first intermediate results for prim. 1 | being read by P.U. 1 | — | filling with data from P.U. 0 | RAM 0 | first intermediate results for prim. 1 | generate first part of final results for prim. 1 | output data path |
| 3 | — | — | — | — | — | — | second intermediate results for prim. 1 | being read by P.U. 1 | RAM 1 | second intermediate results for prim. 1 | generate second part of final results for prim. 1 | output data path |
| 4 | input data path | data set for prim. 2 | generate first intermediate results for prim. 2 | RAM 0 | — | filling with data from P.U. 0 | — | — | — | — | — | — |
| 5 | input data path | data set for prim. 2 | generate second intermediate results for prim. 2 | RAM 1 | first intermediate results for prim. 2 | being read by P.U. 1 | — | filling with data from P.U. 0 | RAM 0 | first intermediate results for prim. 2 | generate first part of final results for prim. 2 | output data path |
| 6 | — | — | — | — | — | — | second intermediate results for prim. 2 | being read by P.U. 1 | RAM 1 | second intermediate results for prim. 2 | generate second part of final results for prim. 2 | output data path |

Referring now to Table 2, we will walk through an example in which two graphics primitives, called primitives 1 and 2, are processed in positional lighting mode. (Recall that, in positional lighting mode, additional calculations are required for each primitive.) In row 1, processing unit 0 begins processing primitive 1 by generating a first set of intermediate results and storing them in RAM 0. In a preferred embodiment, this first set of intermediate results would be results from transformations and partial slope calculations. In row 2, processing unit 1 generates a first part of the final results for primitive 1 (completed transformations and slopes) by reading the first set of intermediate results from RAM 0. Meanwhile, processing unit 0 begins performing positional lighting calculations for primitive 1 (sum-of-squares calculations) and storing these as a second set of intermediate results in RAM 1. In row 3, processing unit 1 reads this second set of intermediate results from RAM 1 and generates the second part of the final results for primitive 1. (The second part of the final results for primitive 1 might include, for example, the ambient, diffuse and specular color contributions for each light source and each vertex of primitive 1. As those having ordinary skill in the art of graphics processing will readily understand, these values may be calculated based in part on the attenuation factor and spot light effect for each light and each vertex, which in turn may be calculated after the distance of each light from each vertex is known. Distances would be calculated by determining the square roots of the sum-of-squares results generated by processing unit 0.) In rows 4, 5 and 6, the process is repeated for primitive 2.

and writes, respectively. In row 1, processing unit 0 begins processing primitive 1 by generating a first set of intermediate results and storing them in RAM 0. (Again, in a preferred embodiment, this first set of intermediate results would be results from transformations and partial slope calculations.) In row 2, processing unit 1 generates a first part of the final results for primitive 1 (completed transformations and slopes) by reading the first set of intermediate results from RAM 0. Meanwhile, processing unit 0 begins performing positional lighting calculations for primitive 1 (sum-of-squares calculations) and storing these as a second set of intermediate results by writing them into the FIFO buffer that has been created using RAM 1 as described above. In row 3, processing unit 0 continues calculating sum-of-squares lighting information and sending it to the FIFO buffer, while processing unit 1 begins reading the FIFO buffer and completing the lighting calculations (by determining the square roots of the sum-of-squares results and using the distance values to calculate color contributions for the vertices), thus generating the second part of the final

TABLE 3

Positional Lights Mode
(Alternative method in which RAM 1 acts as a FIFO)

| | Processing Unit 0 | | | | | | | Processing Unit 1 | | | |
|---|---|---|---|---|---|---|---|---|---|---|---|
| | | Description of inputs | Description of operations | Destination of outputs | RAM 0 | | RAM 1 | | | | |
| Row | Source of inputs | | | | Contents | Status | Contents | Status | Source of inputs | Description of inputs | Description of operations | Destination of outputs |
| 1 | input data path | data set for prim. 1 | generate first intermediate results for prim. 1 | RAM 0 | — | filling with data from P.U. 0 | — | — | — | — | — | — |
| 2 | input data path | data set for prim. 1 | generate second intermediate results for prim. 1 | RAM 1 | first intermediate results for prim. 1 | being read by P.U. 1 | — | filling with data from P.U. 0 in FIFO fashion | RAM 0 | first intermediate results for prim. 1 | generate first part of final results for prim. 1 | output data path |
| 3 | input data path | data set for prim. 1 | continued | continued | — | — | accumulation of second intermediate results for prim. 1 not yet read by P.U. 1 | simultaneously filling with data from P.U. 0 and being read by P.U. 1 in FIFO fashion | RAM 1 | second intermediate results for prim. 1 | generate second part of final results for prim. 1 | output data path |
| 4 | — | — | — | — | — | — | remaining portion of second intermediate results for prim. 1 not yet read by P.U. 1 | being read by P.U. 1 in FIFO fashion | RAM 1 | second intermediate results for prim. 1 | continued | continued |

Table 3 illustrates an alternative preferred method for processing primitives in positional lighting mode. In this alternative method, one of the dual-port RAMs of graphics processor 200 (RAM 1 in this embodiment) is used as a FIFO buffer. This is accomplished by having write address generator 260 and read address generator 254 provide the read and write pointers necessary to implement the FIFO, and by using wires 282 and 284 to keep track of FIFO reads results for the primitive and sending them to the output path. In row 4, processing unit 0 has completed its job, and processing unit 1 finishes reading the FIFO buffer and completes sending the final results for the primitive to the output path. In one preferred embodiment, processing unit 0 may be configured to begin processing another primitive in row 4. In another preferred embodiment, processing unit 0 may be configured to wait until processing unit 1 has finished processing primitive 1 before processing unit 0 starts the next primitive.

One advantage of using the alternative method illustrated in Table 3 is that the dual-port RAMs may be made smaller than would be the case in Table 2. This is because, while many results are calculated per primitive in the context of determining sum-of-squares distances of vertices from light sources, only a subset of those results must be stored at any given time when the RAM is used as a FIFO and both processing units are working on the distance calculations at the same time.

Figure 3:
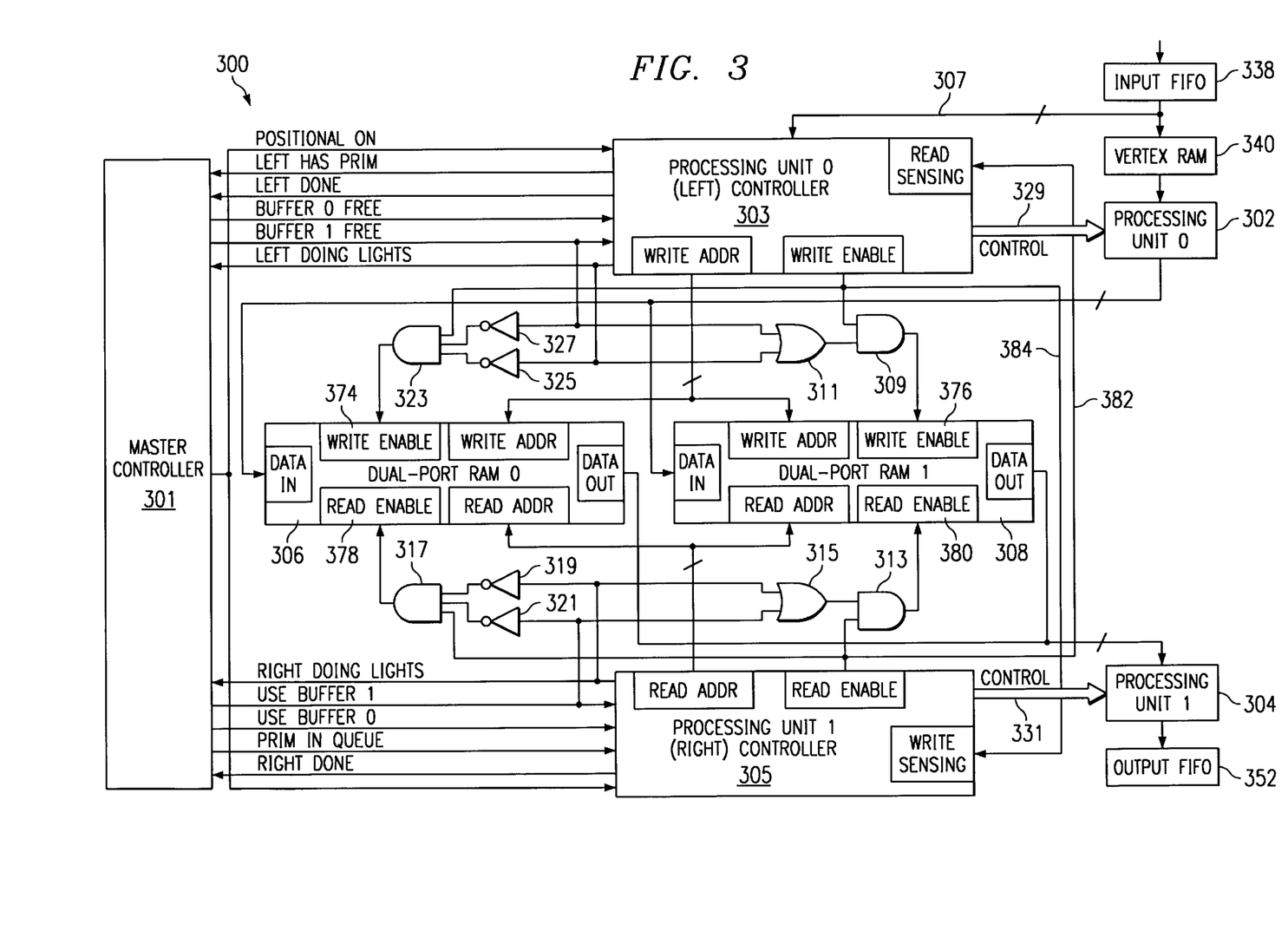
FIG. 3 is a block diagram showing, in more detail, a graphics processor configured according to a preferred embodiment of the invention.

FIG. 3 is a block diagram illustrating a graphics processor 300 configured according to a preferred embodiment of the invention. While graphics processor 300 is functionally equivalent to graphics processor 200, it is believed that graphics processor 300 may represent a more practical implementation. In graphics processor 300, the functions of write address generator 260, read address generator 254, write enable generator 266, read enable generator 270, write enable gating device 268, read enable gating device 272, gating controller 288 and sensing means 282 and 284 are subsumed within master controller 301, left controller 303, right controller 305 and all of the combinational logic and wiring shown between left controller 303 and right controller 305. Signal descriptions will now be given for a better understanding of graphics processor 300.

Positional On: Graphics processor 300 is assumed to contain a mode register (not shown) which is written by a host processor such as that in host system 104. The mode register would contain, for example, one bit for each light source active in a modeling scene involving positional lighting. The Positional On signal may be derived by logically OR-ing each of those bits in the mode register. If Positional On is not asserted, then graphics processor 300 will process all primitives in non-positional lighting mode, as in the illustration of Table 1. On the other hand, when the mode register is written to indicate positional lighting, the Positional On signal is asserted, causing all primitives to be processed in positional lighting mode, as in the illustration of Table 3. (The assertion of Positional On activates mechanisms within left controller 303 and right controller 305 that cause RAM 308 to behave as a FIFO buffer.)

Left Has Prim: While vertex information for a given primitive is loaded into vertex RAM 340, left controller 303 monitors the address lines of the input data path using bus 307. In this manner, left controller 303 can detect when the command is received by graphics processor 300 ordering it to begin drawing the primitive, at which time left controller 303 asserts the Left Has Prim signal.

Buffer 0 Free/Buffer 1 Free: Once master controller 301 has detected the assertion of Left Has Prim, it determines whether either RAM 0 or RAM 1 is available (not being used by processing unit 0, not holding data for processing unit 1, and not being used by processing unit 1). When master controller 301 finds an available RAM, it asserts the corresponding Buffer Free signal. Left controller 303 uses this assertion as a start timing signal to begin processing the primitive. The combinational logic (to be described below) uses this assertion to gate the write enable signal to the corresponding RAM, so that the results from processing unit 0 will be written to the RAM indicated by the Buffer Free signal. The Buffer Free signal remains asserted until Left Done is asserted.

Left Done: Left controller 303 asserts this signal when processing unit 0 has completed its calculations for whichever primitive it is processing.

Left Doing Lights: When graphics processor 300 is in positional lighting mode (Positional On is asserted), left controller 303 asserts Left Doing Lights when processing unit 0 finishes generating its first set of intermediate results and begins generating its second set of intermediate results. In positional lighting mode, Left Done is not asserted until after processing unit 0 has finished generating both sets of intermediate results for the primitive.

Prim In Queue: When processing unit 0 has finished generating a set of intermediate results and left controller 303 so indicates by asserting either Left Done (in non-positional lighting mode) or Left Doing Lights (in positional lighting mode), master controller 301 signals processing unit 1 to begin by asserting Prim In Queue. (See also, Use Buffer 0/Use Buffer 1.)

Use Buffer 0/Use Buffer 1: These signals indicate in which RAM (RAM 0 or RAM 1) processing unit 1 should look to find the intermediate results to begin working on. The combinational logic (to be described below) uses this assertion to gate the read enable signal to the corresponding RAM, so that the results from processing unit 0 will be read from the RAM indicated by the Use Buffer signal. The Use Buffer signal remains asserted until Right Done is asserted.

Right Done: Right controller 305 asserts this signal when processing unit 1 has finished generating final results for whichever primitive it is processing. In a preferred embodiment, neither of the Buffer Free signals will be asserted in positional lighting mode until both Left Done and Right Done are asserted.

Right Doing Lights: Right controller 305 asserts this signal in positional lighting mode to indicate that processing unit 1 has finished generating the first part of the final results for the positionally-lighted primitive, and is now beginning to generate the second part of the final results for this primitive. (In a preferred embodiment, the second part of the final results would be the square roots of the sum-of-squares information already calculated by processing unit 0.)

Write sensing line 384 and read sensing line 382 are used in positional lighting mode as part of the mechanism for causing dual-port RAM 308 to function as a FIFO buffer.

The write enable input 374 for RAM 0 is driven by the output of AND gate 323, whose inputs are the inverse of Left Doing Lights (see inverter 325), the inverse of Buffer 1 Free (see inverter 327) and the write enable signal. The read enable input 378 for RAM 0 is driven by the output of AND gate 317, whose inputs are the inverse of Right Doing Lights (see inverter 319), the inverse of Use Buffer 1 (see inverter 321) and the read enable signal.

The write enable input 376 of RAM 1 is driven by the output of AND gate 309, whose inputs are the write enable signal and the output of OR gate 311. The inputs of OR gate 311 are Buffer 1 Free and Left Doing Lights. The read enable input 380 of RAM 1 is driven by the output of AND gate 313, whose inputs are the read enable signal and the output of OR gate 315. The inputs of OR gate 315 are Use Buffer 1 and Right Doing Lights.

The gating of the write enable signal is achieved as follows: When graphics processor 300 is in non-positional lighting mode and a primitive is presented to be processed (Left Has Prim is asserted), assume that master controller 301 determines RAM 0 is idle. It will then assert Buffer 0 Free, and Buffer 1 Free will remain unasserted. Because graphics processor 300 is in non-positional lights mode, Left Doing Lights will never be asserted. Thus, the outputs of both inverters 325 and 327 will be asserted, gating the write enable signal to write enable input 374. Because neither Left Doing Lights nor Buffer 1 Free is asserted, the output of OR gate 311 will be unasserted, thus inhibiting the write enable signal from reaching write enable input 376. On the other hand, if either Buffer 1 Free is asserted or Left Doing Lights is asserted (which will occur when graphics processor 300 is in positional lights mode), then the write enable signal will be inhibited from reaching write enable input 374 and will instead be gated to write enable input 376.

The gating of the read enable signal is achieved as follows: When graphics processor 300 is in non-positional lighting mode and a primitive is being processed, assume processing unit 0 has finished generating its intermediate results and has placed those results in RAM 0. Assume left controller 303 has asserted Left Done. Master controller 301 will then assert Use Buffer 0 (and Prim In Queue), and Use Buffer 1 will remain unasserted. Because graphics processor 300 is in non-positional lights mode, Right Doing Lights will never be asserted. Thus, the outputs of both inverters 319 and 321 will be asserted, gating the read enable signal to read enable input 378. Because neither Right Doing Lights nor Use Buffer 1 is asserted, the output of OR gate 315 will be unasserted, thus inhibiting the read enable signal from reaching read enable input 380. On the other hand, if either Use Buffer 1 is asserted or Right Doing Lights is asserted (which will occur when graphics processor 300 is in positional lights mode), then the read enable signal will be inhibited from reaching read enable input 378 and will instead be gated to read enable input 380.

While the present invention has been described in detail in relation to various preferred embodiments thereof, the described embodiments have been presented by way of example only, and not by way of limitation. It will be understood by those skilled in the art that various changes may be made in the form and details of the described embodiments, resulting in equivalent embodiments that remain within the scope of the appended claims. For example, in a preferred embodiment, processing unit 0 may be configured to be able not only to write to RAM 0 and RAM 1, but also to read therefrom. Such a configuration may facilitate processing of primitives by processing unit 0.

What is claimed is:

1. A method of processing first, second and third data sets, said first, second and third data sets corresponding to first, second and third graphics primitives, respectively, said method comprising the steps of:

generating a first set of results responsive to said first data set using a first processing unit;

passing said first set of results to a second processing unit by storing said first set of results in a first RAM accessible by said second processing unit;

generating a second set of results responsive to said first set of results using said second processing unit, wherein said second set of results comprises output data corresponding to said first graphics primitive;

at least in part concurrently with said step of generating said second set of results, generating a third set of results responsive to said second data set using said first processing unit;

passing said third set of results to said second processing unit by storing said third set of results in a second RAM accessible by said second processing unit;

generating a fourth set of results responsive to said third set of results using said second processing unit, wherein said fourth set of results comprises output data corresponding to said second graphics primitive;

activating a FIFO control mechanism configured to cause said second RAM to behave as a FIFO buffer;

generating a fifth set of results responsive to said third data set using said first processing unit;

passing said fifth set of results to said second processing unit by storing said fifth set of results in said first RAM accessible by said second processing unit;

generating a sixth set of results responsive to said fifth set of results using said second processing unit;

at least in part concurrently with said step of generating said sixth set of results, generating a seventh set of results responsive to said third data set using said first processing unit;

passing said seventh set of results to said second processing unit through said FIFO buffer; and generating an eighth set of results responsive to said seventh set of results using said second processing unit;

wherein both of said sixth and eighth sets of results comprise output data corresponding to said third graphics primitive.

2. A graphics processor capable, in a first mode, of processing two different graphics primitives simultaneously and capable, in a second mode, of processing at least first and second aspects of single graphics primitive simultaneously, said graphics processor comprising:

a graphics processor data input;

a graphics processor data output;

a first processing unit having
   a first processing unit data input and
   a first processing unit data output, and a second processing unit having
   a second processing unit data input and
   a second processing unit data output;

means for communicating data from said graphics processor data input to said first processing unit data input;

means for communicating data from said second processing unit data output to said graphics processor data output;

a first dual port RAM having
   a first read address input,
   a first read enable input,
   a first write address input,
   a first write enable input,
   a first RAM data input, and
   a first RAM data output;

a second dual port RAM having
   a second read address input,
   a second read enable input,
   a second write address input,
   a second write enable input,
   a second RAM data input, and
   a second RAM data output;

a RAM data input bus coupling said first processing unit data output to both of said first and second RAM data inputs;

a RAM data output bus coupling both of said first and second RAM data outputs to said second processing unit data input;

means for generating write addresses;

means for generating a write enable signal;

means for generating read addresses;

means for generating a read enable signal;

a write address bus coupling said means for generating write addresses to both of said first and second write address inputs;

a read address bus coupling said means for generating read addresses to both of said first and second read address inputs;

means, coupled to said means for generating a write enable signal and to both of said first and second write enable inputs, for time-division gating said write enable signal to said first and second write enable inputs;

means, coupled to said means for generating a read enable signal and to both of said first and second read enable inputs, for time-division gating said read enable signal to said first and second read enable inputs; and control means, coupled to both of said means for time-division gating said write enable signal and said means for time-division gating said read enable signal, for controlling the gating of said write enable signal and said read enable signal, said control means capable of operating in at least first, second and third states such that, when said graphics processor is operating in said first mode, said first and second states are alternately operable such that, when said control means is in said first state, data from said first processing unit data output are written into said first dual port RAM while data for said second processing unit data input are read from said second dual port RAM and, when said control means is in said second state, data from said first processing unit data output are written into said second dual port RAM while data for said second processing unit data input are read from said first dual port RAM, and when said graphics processor is operating in said second mode, said third state is operable such that data from said first processing unit data output are written into said first dual port RAM when said first processing unit is processing said first aspect and data from said first processing unit data output are written into said second dual port RAM when said first processing unit is processing said second aspect, and data for said second processing unit data input are read from said first dual port RAM when said second processing unit is processing said first aspect and data for said second processing unit data input are read from said second dual port RAM when said second processing unit is processing said second aspect.

3. The graphics processor of claim 2, further comprising:

means, coupled to said means for generating read addresses, for sensing when said write enable signal has been asserted;

means, coupled to said means for generating write addresses, for sensing when said read enable signal has been asserted; and wherein said means for generating write addresses and said means for generating read addresses are operable to cause said second dual port RAM to function as a FIFO buffer when said third state is operable.

* * * * *